(12) United States Patent
Onizuka et al.

(10) Patent No.: US 7,858,726 B2
(45) Date of Patent: Dec. 28, 2010

(54) PROCESS FOR PRODUCING LOW-MOLECULAR POLYPHENYLENE ETHER

(75) Inventors: Kenzo Onizuka, Tokyo (JP); Minoru Sakurai, Tokyo (JP)

(73) Assignee: Asahi Kasei Chemichals Corporation, Tokyo (JP)

( * ) Notice: Subject to any disclaimer, the term of this patent is extended or adjusted under 35 U.S.C. 154(b) by 0 days.

(21) Appl. No.: 12/224,181

(22) PCT Filed: Feb. 14, 2007

(86) PCT No.: PCT/JP2007/052577
§ 371 (c)(1),
(2), (4) Date: Aug. 20, 2008

(87) PCT Pub. No.: WO2007/097231
PCT Pub. Date: Aug. 30, 2007

(65) Prior Publication Data
US 2009/0018303 A1    Jan. 15, 2009

(30) Foreign Application Priority Data
Feb. 21, 2006  (JP) .............................. 2006-043881

(51) Int. Cl.
C08G 59/68 (2006.01)
C08G 61/02 (2006.01)
C08G 63/78 (2006.01)
C08G 65/38 (2006.01)

(52) U.S. Cl. ........................... 528/88; 528/86; 528/205; 528/219

(58) Field of Classification Search ..................... 528/88
See application file for complete search history.

(56) References Cited

U.S. PATENT DOCUMENTS

| | | | | |
|---|---|---|---|---|
| 5,834,565 A * | 11/1998 | Tracy et al. | .................. | 525/391 |
| 5,880,221 A * | 3/1999 | Liska et al. | .................. | 525/397 |
| 2003/0045757 A1* | 3/2003 | Ishii et al. | .................... | 568/660 |
| 2003/0194562 A1 | 10/2003 | Ishii et al. | | |
| 2007/0093614 A1 | 4/2007 | Uchida et al. | | |

FOREIGN PATENT DOCUMENTS

| | | |
|---|---|---|
| EP | 0537005 A1 | 4/1993 |
| EP | 0592145 A2 | 4/1994 |
| EP | 1 176 172 | 1/2002 |
| EP | 1 630 199 | 3/2006 |
| JP | 2-233723 | 9/1990 |
| JP | 8-236942 | 9/1996 |
| JP | 2667625 | 6/1997 |
| JP | 9-235349 | 9/1997 |
| JP | 9-291148 | 11/1997 |
| JP | 2000-509097 | 7/2000 |
| JP | 3248424 | 11/2001 |
| JP | 3300426 | 4/2002 |
| JP | 2003-2965 | 1/2003 |
| JP | 2003-292570 | 10/2003 |
| JP | 2004-256717 | 9/2004 |
| WO | 2004/104097 | 12/2004 |

OTHER PUBLICATIONS

Herbert S.-I. Chao., et al., "Poly 2,6-Dimethyl-1,4-Phenylene Ether (PPE) Redistribution and Its Significance in the Preparation of PPE/Epoxy Laminate", *Reactive Polymers*, 15 (1991), pp. 9-23, Elsevier Science Publishers B.V., Amsterdam.

International Search Report mailed on Apr. 24, 2007 in connection with International Application No. PCT/JP2007/052577.

Dwain M. White, "The Synthesis of 4-Hydroxyarylene Ethers by the Equilibration of Phenols with Poly(2,6-dimethyl-1,4-phenylene ether)," Journal of Organic Chemistry, vol. 34, No. 2, Feb. 1969, pp. 297-303.

Search Report and Written Opinion for corresponding Singapore Patent Application No. 200805718-4, mailed Oct. 18, 2010.

* cited by examiner

*Primary Examiner* — Mark Eashoo
*Assistant Examiner* — David Karst
(74) *Attorney, Agent, or Firm* — Staas & Halsey LLP

(57) ABSTRACT

A process for producing a low-molecular polyphenylene ether having a content of components with molecular weights of 20,000 or more of 10 mass % or less and a number average molecular weight of 4,000 or less by a redistribution reaction which involves reacting a raw polyphenylene ether having a number average molecular weight of 10,000 or more with a polyphenol compound and a radical initiator, characterized in that the redistribution reaction step is a step conducted in a solvent; the ratio of the raw polyphenylene ether to the solvent (raw polyphenylene ether:solvent) (mass ratio) is provided at 0.4:100 to 40:100 (mass ratio); and the ratio of the radical initiator to the solvent (radical initiator:solvent) (mass ratio) is provided at 0.5:100 to 5:100 (mass ratio).

11 Claims, No Drawings

PROCESS FOR PRODUCING LOW-MOLECULAR POLYPHENYLENE ETHER

CROSS REFERENCE TO RELATED PATENT APPLICATIONS

This application claims the benefit under 35 U.S.C. Section 371, of PCT International Application No. PCT/JP2007/052577, filed Feb. 14, 2007, which claimed priority to Japanese Application No. 2006-043881 filed Feb. 21, 2006 in the Japanese Patent Office, the disclosures of which are hereby incorporated by reference.

TECHNICAL FIELD

The present invention relates to a process for producing a low-molecular polyphenylene ether; a low-molecular polyphenylene ether; a process for producing an epoxidized polyphenylene ether; an epoxy resin composition; and an electronic member.

BACKGROUND ART

Epoxy resins, which are excellent in cost performance, are widely used as insulating materials for printed wiring boards. In recent years, these epoxy resins have also been required to have higher-functional physical properties to, for example, support a higher density of wiring. By way of example, for printed wiring boards used in high frequency applications such as satellite communications, there has been a need for an insulating material having excellent dielectric characteristics such as a low dielectric constant and a low loss tangent in view of preventing signal delay.

The use of a polyphenylene ether as one of the materials excellent in dielectric characteristics has been known since the 1970s or so. However, a high-molecular polyphenylene ether is very poor in moldability because of its high melt viscosity. For example, Patent Documents 1 and 2 also each describe a process for producing a laminated board by preparing a toluene solution of a polyphenylene ether and impregnating the toluene solution into a substrate while heating the solution. However, such a process is very dangerous which involves impregnating a toluene solution while heating the solution.

In addition, a polyphenylene ether is generally poor in compatibility with an epoxy resin. Thus, when a simple mixture of the polyphenylene ether with the resin is used as a raw material for a molded article, it often represents a challenge to improve the mechanical strength of the resulting molded article.

To solve these problems, Patent Documents 3 and 4 each describe a process for producing a modified polyphenylene ether by converting a polyphenylene ether into a lower-molecular polymer by a redistribution reaction and epoxidizing the polymer using epichlorohydrin.

Patent Documents 5 and 6 each also describe a process which involves producing a low-molecular form of polyphenylene ether by a polymerization method and then epoxy-modifying the polyphenylene ether.

[Patent Document 1] Japanese Patent No. 2667625
[Patent Document 2] Japanese Patent No. 3300426
[Patent Document 3] JP-A-9-235349
[Patent Document 4] Japanese Patent No. 3248424
[Patent Document 5] WO2004/104097
[Patent Document 6] JP-A-2004-256717

DISCLOSURE OF THE INVENTION

Problems to be Solved by the Invention

However, the processes described in Patent Documents 3 and 4 still admit of improvement in terms of the rate of reaction during the redistribution reaction and the handleability of the resulting low-molecular polyphenylene ether. The epoxidized polyphenylene ethers described in Patent Documents 3 and 4 also still have room for improvement in terms of the curing rate and the like when forming a composition with an epoxy resin.

On the other hand, the processes described in Patent Documents 5 and 6 cannot be said to be simple processes and still admit of improvement in terms of the production efficiency.

The present invention has been made in view of these circumstances. Thus, a main object of the present invention is to provide a process for producing an epoxidized polyphenylene ether having good handleability. Another object of the present invention is to provide a process for producing a low-molecular polyphenylene ether suitable as a raw material for the epoxidized polyphenylene ether.

Means for Solving the Problems

The present inventors have carried out intensive studies for solving the above problems. As a result, the inventors have found that controlling reaction conditions in conducting the redistribution reaction can simply provide a low-molecular polyphenylene ether suitable as a raw material for an epoxidized polyphenylene ether having good handleability, thereby accomplishing the present invention.

Thus, the present invention provides a process for producing a low-molecular polyphenylene ether, a low-molecular polyphenylene ether, a process for producing an epoxidized polyphenylene ether, an epoxy resin composition, and an electronic member as described below.

(1) A process for producing a low-molecular polyphenylene ether having a content of components with molecular weights of 20,000 or more of 10 mass % or less and a number average molecular weight of 4,000 or less by a redistribution reaction which involves reacting a raw polyphenylene ether having a number average molecular weight of 10,000 or more with a polyphenol compound and a radical initiator, characterized in that:
the redistribution reaction step is a step conducted in a solvent;
the ratio of the raw polyphenylene ether to the solvent (raw polyphenylene ether:solvent) (mass ratio) is provided at 0.4:100 to 40:100 (mass ratio); and
the ratio of the radical initiator to the solvent (radical initiator:solvent) (mass ratio) is provided at 0.5:100 to 5:100 (mass ratio).

(2) The production process described in item (1), wherein the low-molecular polyphenylene ether has an average number of phenolic hydroxyl groups per molecule of 1.2 or more.

(3) The production process described in item (1) or (2), wherein the redistribution reaction step is a step performed using at least one catalyst selected from the group consisting of metal naphthenates, vanadium pentoxide, aniline, amine compounds, quaternary ammonium salts, imidazole, and phosphonium salts.

(4) The production process described in item (1), (2), or (3), wherein the redistribution reaction step is a step in which the radical initiator is added at an average rate of 0.1 part by mass/minute or less based on 100 parts by mass of the raw polyphenylene ether.

(5) The production process described in any of items (1) to (4), wherein the redistribution reaction step is a step in which the radical initiator is added under such conditions that the threshold value provided as the decomposition rate constant of the radical initiator divided by the addition time of the peroxide is 0.5 (1/hr) or less.

(6) The production process described in any of items (1) to (5), wherein the process comprises a step of washing the low-molecular polyphenylene ether with water and/or an alkaline solution after the redistribution reaction step.

(7) The production process described in any of items (1) to (6), wherein the radical initiator is benzoyl peroxide or a benzoyl peroxide derivative.

(8) A low-molecular polyphenylene ether having a content of components with molecular weights of 20,000 or more of 10 mass % or less and a number average molecular weight of 4,000 or less, characterized in that a molecular chain end unit having both a phenolic hydroxyl group and a methylene group present in the ortho position to the phenolic hydroxyl group accounts for 1 to 20 mass % of the molecular mass.

(9) A process for producing an epoxidized polyphenylene ether resin by addition of phenolic hydroxyl groups contained in a low-molecular polyphenylene ether having a number average molecular weight of 4,000 or less to epoxy groups contained in an epoxy compound, characterized in that:

the low-molecular polyphenylene ether has a content of components with molecular weights of 20,000 or more of 10 mass % or less; and the epoxy compound has an average number of the epoxy groups per molecule of 2 or more.

(10) The production process described in item (9), wherein the low-molecular polyphenylene ether has an average number of the phenolic hydroxyl groups per molecule of 1.2 or more.

(11) The production process described in item (9) or (10), wherein the low-molecular polyphenylene ether is a low-molecular polyphenylene ether obtained by the production process described in any of items (1) to (7), or the low-molecular polyphenylene ether described in item (8).

(12) An epoxy resin composition comprising the epoxidized polyphenylene ether resin obtained by the production process described in any of items (9) to (11), an epoxy resin, and a curing agent for epoxy resin.

(13) An electronic member selected from the group consisting of an epoxy prepreg, a laminated board from an epoxy prepreg, a resin sheet, and a laminated board from a resin sheet, the member being formed using the epoxy resin composition described in item (12).

Advantages of the Invention

The present invention provides a process for producing an epoxidized polyphenylene ether having good solubility in a solvent and excellent in handleability, and the like. There is also provided a process for producing a low-molecular polyphenylene ether suitable as a raw material for the epoxidized polyphenylene ether.

BEST MODE FOR CARRYING OUT THE INVENTION

A best mode for carrying out the present invention (hereinafter referred to as an embodiment of the present invention) is described below in detail. In this respect, the present invention is not intended to be limited to the following embodiment, and various modifications can be made within the scope of the gist of the invention.

Process for Producing Low-molecular Polyphenylene Ether

The process for producing a low-molecular polyphenylene ether according to the present embodiment is a process for producing a low-molecular polyphenylene ether having a content of components with molecular weights of 20,000 or more of 10 mass % or less and a number average molecular weight of 4,000 or less by a redistribution reaction which involves reacting a raw polyphenylene ether having a number average molecular weight of 10,000 or more with a polyphenol compound and a radical initiator, characterized in that:

the redistribution reaction step is a step conducted in a solvent;

the ratio of the raw polyphenylene ether to the solvent (raw polyphenylene ether:solvent) (mass ratio) is provided at 0.4:100 to 40:100 (mass ratio); and the ratio of the radical initiator to the solvent (radical initiator:solvent) (mass ratio) is provided at 0.5:100 to 5:100 (mass ratio).

Here, the "redistribution reaction" refers to the reaction described in an academic document, "Journal of Organic Chemistry, 34: 297-303 (1969)". Specifically, the redistribution reaction is a reaction in which a polyphenylene ether having a high number average molecular weight is reacted with a polyphenol compound in the presence of a radical initiator to provide a polyphenylene ether having, for example, a number average molecular weight of 4,000 or less.

The probable mechanism of the redistribution reaction is as follows. Specifically, the polyphenylene ether and polyphenol compound are both first radicalized by the radical initiator. The radical then moves in the polyphenylene ether molecule. At the destination of the radical, the radicalized phenol compound subsequently deprives the polyphenylene ether of some of the constituent units thereof. Thus the redistribution reaction is a reaction in which constituent units of the polyphenylene ether are distributed to the phenol compound. Constituent units of the polyphenylene ether are successively distributed to the phenol compound unless the radical disappears.

According to the present embodiment, the "low-molecular polyphenylene ether" also refers to a polyphenylene ether having a number average molecular weight of 4,000 or less. According to the present embodiment, the "number average molecular weight" and "content of components with molecular weights of 20,000 or more" are measured by gel permeation chromatography (hereinafter sometimes abbreviated as "GPC method") using polystyrene as a reference substance. The "content of components with molecular weights of 20,000 or more" refers to the proportion of the peak detection area of components with molecular weights of 20,000 or more. "A content of components having a molecular weight of 20,000 or more of substantially 0 mass %" means that the molecular weight at the start of peak detection is 20,000 or less in measurement by gel permeation chromatography.

The raw polyphenylene ether used in the present embodiment may be a commercial product.

The polyphenol compound used in the present embodiment is a compound having two or more phenol groups in one molecule. Specific examples thereof include bisphenol A, tetramethylbisphenol A, tetramethylbiphenyl, dihydroxydiphenyl ether, phenol novolac, and cresol novolac. These compounds may be used alone or in a combination of two or more thereof. In this respect, the above polyphenol compound used may be a commercial product.

Examples of the radical initiator used in the present embodiment include dicumyl peroxide, tert-butylcumyl peroxide, di-tert-butyl peroxide, 2,5-dimethyl-2,5-di-tert-butylcumyl peroxyhexyne-3, 2,5-dimethyl2,5-di-(tert-butylperoxy)hexane, p-menthane hydroperoxide, diisopropylbenzene hydroperoxide, tert-butyl hydroperoxide, tert-butyl peroxyacetate, tert-butylperoxybenzene, diisobutyl peroxide, tert-hexyl peroxyisopropyl monocarbonate, tert-butyl peroxyisopropyl monocarbonate, tert-butyl peroxyacetate, tert-butyl peroxybenzoate, benzoyl peroxide, and benzoyl peroxide derivatives. These compounds may be used alone or in a combination of two or more thereof.

When, among others, benzoyl peroxide or a benzoyl peroxide derivative is used, an alkaline washing step to be described later can increase the number of hydroxyl groups contained in the low-molecular polyphenylene ether. The increased number of hydroxyl groups can contribute to improvement in physical properties of a cured product, such as glass transition temperature.

In this respect, the term "benzoyl peroxide derivative" refers to a compound having the form of benzoyl peroxide whose benzene ring structure has a substituent such as a methyl group and an ethyl group.

Whether benzoyl peroxide has been used as a radical initiator or not can be determined by measuring the resulting low-molecular polyphenylene ether using a nuclear magnetic resonance apparatus (hereinafter sometimes abbreviated as "NMR") to examine whether a peak derived from a benzyl group or a benzoyl group is observed or not.

According to the present embodiment, the redistribution reaction step is preferably a step conducted in a solvent in view of preventing an abnormal reaction. Examples of the solvent include aromatic hydrocarbons such as benzene, toluene, xylene, mesitylene, and dichlorobenzene and chloroform.

Here, the ratio of the raw polyphenylene ether to the solvent (raw polyphenylene ether:solvent) (mass ratio) is provided preferably at 0.4:100 to 40:100, more preferably at 4:100 to 40:100, still more preferably at 8:100 to 20:100. The amount of the raw polyphenylene ether of 0.4 part by mass or more based on 100 parts by mass of the solvent can contribute to conducting the redistribution reaction with good productivity without using an unnecessarily large amount of the solvent. The amount of 40 parts by mass or less can contribute to maintaining the solution viscosity before charging the radical initiator in an appropriate range, to being able to mix the radical initiator rapidly and uniformly, or to reducing the generation of by-products.

According to the present embodiment, the ratio of the radical initiator to the solvent (radical initiator:solvent) (mass ratio) is provided preferably at 0.5:100 to 5:100, more preferably at 1:100 to 3:100. The amount of the radical initiator of 0.5 part by mass or more based on 100 parts by mass of the solvent can contribute to conducting the redistribution reaction with good productivity without using an unnecessarily large amount of the solvent. It also facilitates the proceeding of the reaction because both the raw polyphenylene ether and polyphenol compound may be radicalized. On the other hand, the amount of 50 parts by mass or less can contribute to preventing temperature rise due to the exothermic heat of decomposition of the radical initiator or to reducing the generation of by-products.

Thus, according to the present embodiment, setting the ratio of the raw polyphenylene ether to the solvent and the ratio of the radical initiator to the solvent in the above ranges reduces the residual ratio of a polyphenylene ether having a molecular weight of 20,000 or more although the details are uncertain. The reduced content of components with molecular weights of 20,000 or more in the low-molecular polyphenylene ether can contribute to improving the solubility in the solvent of the epoxidized polyphenylene ether obtained by epoxidizing the low-molecular polyphenylene ether. In other words, an epoxidized polyphenylene ether can be achieved which is excellent in handleability (hardly precipitated from the solvent even at room temperature or good in solution storage properties).

According to the present embodiment, the redistribution reaction step is preferably a step which is performed using at least one catalyst selected from the group consisting of metal naphthenates, vanadium pentoxide, aniline, amine compounds, quaternary ammonium salts, imidazole, and phosphonium salts in view of improving the reaction rate and decreasing high molecular weight components.

Specifically, in the redistribution reaction, an oxygen radical derived from a phenolic hydroxyl group present at the molecular chain end forms a reactive site. Here, a plurality of oxygen radicals may bind to each other to terminate the reaction (produce a peroxide). The use of the above catalyst can contribute to again decomposing the peroxide to regenerate the reactive site.

Specific examples of the catalyst include naphthenates such as cobalt naphthenate, zinc naphthenate, manganese naphthenate, and lead naphthenate; vanadium pentoxide; anilines such as dimethylaniline; amine compounds; quaternary ammonium salts such as tetramethylammonium chloride, and tetrabutylammonium bromide; imidazoles; and phosphonium salts. These catalysts may be used alone or in a combination of two or more thereof.

The catalyst may be added not only before charging the radical initiator but also after the charge.

According to the present embodiment, the ratio of the catalyst to the raw polyphenylene ether (catalyst:raw polyphenylene ether) (mass ratio) is provided preferably at 0.01:100 to 1:100, more preferably at 0.1:100 to 0.5:100. The amount of the catalyst of 0.01 part by mass or more based on 100 parts by mass of the raw polyphenylene ether can contribute to favorably reducing the molecular weight of the polyphenylene ether. The amount of 1 part by mass or less can contribute to maintaining the electrical characteristics of the resulting epoxy resin composition without unduly reducing the molecular weight of the polyphenylene ether.

The redistribution reaction step is a step in which the radical initiator is preferably added at an average rate of 0.1 part by mass/minute or less, more preferably 0.05 part by mass/minute or less based on 100 parts by mass of the raw polyphenylene ether in view of suppressing a side reaction.

The average addition rate of 0.1 part by mass/minute or less can contribute to preventing the reaction of radicals generated from the radical initiator or to preventing the reaction of the radicalized polyphenylene ether with the radical generated from the radical initiator, the reaction of the radicalized phenol compound with the radical generated from the radical initiator, the reaction of molecules of the radicalized polyphenylene ether, or the reaction of molecules of the radicalized phenol compound. In other words, in the redistribution reaction, the polyphenylene ether can be efficiently reacted with the phenol compound. Thus, the average addition rate of 0.1 part by mass/minute or less can contribute to increasing the number of phenolic hydroxyl groups per radical molecule and reducing the content of components with molecular weights of 20,000 or more.

The redistribution reaction step is also a step in which the radical initiator is added at such an average addition rate that the threshold value provided as the decomposition rate constant of the radical initiator divided by the addition time of the peroxide is preferably 0.5 (1/hr) or less, more preferably 0.2 (1/hr) or less.

The threshold value of 0.5 (1/hr) or less can contribute to preventing the reaction of radicals. In other words, the threshold value of 0.5 (1/hr) or less can contribute to decreasing the molecular weight distribution value of the resulting low-molecular polyphenylene ether and improving the electrical characteristics and solvent solubility thereof. In this respect, the molecular weight distribution can be determined by the above GPC method.

The "decomposition rate constant of the radical initiator" is determined from the frequency factor and activation energy of the radical initiator. The decomposition rate constant can be described as follows where A is a frequency factor; $\Delta E$ is an activation energy; R is a gas constant; and T is an absolute temperature.

$$\text{Decomposition rate constant} = A\exp(-\Delta E/RT)$$

The production process of the present embodiment preferably comprises the step of washing the low-molecular polyphenylene ether with water and/or an alkaline solution after the redistribution reaction step. The redistribution reaction usually leaves the residue of the radical initiator. Going through the washing step can contribute to removing the residue or the like of the radical initiator and an alcohol, a carboxylic acid, and the like present in the reaction system and can dramatically promote an epoxidation reaction in epoxidizing the low-molecular polyphenylene ether. It can also suppress a gelation reaction in the epoxidation reaction and reduce the viscosity of the reaction solution.

The washing step can be carried out at room temperature; however, it is preferably performed at 60° C. or higher, more preferably 80° C. or higher. A higher liquid temperature makes the washing rate higher.

The low-molecular polyphenylene ether obtained by the production process of the present embodiment has a higher molecular weight than the average molecular weight estimated from the number average molecular weight shown, for example, in Table 8 in the academic document: Reactive Polymers, 15: 9-23 (1991) in which the redistribution reaction is described, although the details are uncertain. The low-molecular polyphenylene ether also has a far lower molecular weight distribution value than the Mw/Mn calculated from the table. In the document, the Mw/Mn value, as determined by the GPC method, varies between 2.7 and 3.4, but does not seem to be lowered below this range. In contrast, the low-molecular polyphenylene ether obtained by the production process of the present embodiment can achieve an Mw/Mn value of 2.3 or less.

Low-molecular Polyphenylene Ether

The low-molecular polyphenylene ether of the present embodiment is a low-molecular polyphenylene ether having a content of components with molecular weights of 20,000 or more of 10 mass % or less and a number average molecular weight of 4,000 or less, characterized in that a molecular chain end unit having both a phenolic hydroxyl group and a methylene group present in the ortho position to the phenolic hydroxyl group accounts for 1 to 20 mass % of the molecular mass. The low-molecular polyphenylene ether can be suitably obtained by the above-described process for producing a low-molecular polyphenylene ether.

Here, a molecular chain end unit having both a phenolic hydroxyl group and a methylene group present in the ortho position to the phenolic hydroxyl group accounts for 1 to 20 mass %, preferably 2 to 10 mass % of the molecular mass. The content of 1 mass % or more can suppress the introduction of double bonding into the molecular chain end unit (conversion to a quinone). The reduced introduction amount of double bonding leads to the improved whiteness degree of the product, which is preferable in view of easily detecting contamination with impurities. On the other hand, the content of 20 mass % or less can contribute to improving the reaction rate in epoxidizing the phenolic hydroxyl group of the molecular chain end.

The term "molecular chain end unit" is a concept including a benzene ring present at the end position of polyphenylene ether (one molecule) and a substituent which the benzene ring has. What substituent is introduced into the molecular chain end unit can be analyzed by structural identification using NMR.

Process for Producing Epoxidized Polyphenylene Ether

The process for producing an epoxidized polyphenylene ether according to the present embodiment is a process for producing an epoxidized polyphenylene ether resin by addition of phenolic hydroxyl groups contained in a low-molecular polyphenylene ether having a number average molecular weight of 4,000 or less to epoxy groups contained in an epoxy compound.

Here, the number average molecular weight of the low-molecular polyphenylene ether is 4,000 or less, preferably 3,000 or less, more preferably 2,500 or less; the lower limit thereof is preferably 500 or more, more preferably 1,000 or more. The number average molecular weight of the low-molecular polyphenylene ether of 4,000 or less reduces the melt viscosity of the low-molecular polyphenylene ether and can contribute to improving the handleability thereof. The number average molecular weight of 1,000 or more can contribute to improving the electrical characteristics.

The content of components with number average molecular weights of 20,000 or more in the low-molecular polyphenylene ether is 10 mass % or less, preferably 5 mass % or less, more preferably 2 mass % or less, still more preferably 1 mass % or less and may be substantially 0 mass %. Setting the content to the range can contribute to improving the handleability (enhancing the solvent solubility) of the epoxidized polyphenylene ether obtained by the epoxidation. The content of 1% or less can also contribute to achieving good solubility in a ketone solvent.

In this respect, the low-molecular polyphenylene ether can be obtained by the above-described process for producing a low-molecular polyphenylene ether.

Here, the average number of phenolic hydroxyl groups contained in one molecule of the low-molecular polyphenylene ether is preferably 1.2 or more, more preferably 1.5 or more, still more preferably 1.7 or more; the upper limit thereof is preferably 5 or less, more preferably 3 or less. The average number of the hydroxyl groups of the low-molecular polyphenylene ether of 1.2 or more can contribute to making it more reactive to the epoxy resin. The larger number of phenolic hydroxyl groups makes the epoxidized polyphenylene ether's properties closer to those of the epoxy resin, which may enhance the reactivity of the epoxidized polyphenylene ether. The average number of the hydroxyl groups of the low-molecular polyphenylene ether of 5 or less has the merit of suppressing a sharp rise in the melt viscosity even when a large amount of the polyphenylene ether is charged in the epoxy modification.

In this respect, according to the present embodiment, the average number of phenolic hydroxyl groups contained in one molecule of the low-molecular polyphenylene ether is calculated from the phenolic hydroxyl group equivalent and the number average molecular weight.

The average number of epoxy groups contained in one molecule of the epoxy compound used in the production process of the present embodiment is 2 or more, preferably 2.5 or more, more preferably 3 or more, and the upper limit thereof is preferably 7 or less, more preferably 5.5 or less. Setting the average number of epoxy groups contained in one molecule to 2 or more has the merit of uniformly curing the epoxidized polyphenylene ether together with the epoxy resin. Setting it to 7 or less can contribute to suppressing a side reaction (gelation or the like) in epoxy-modifying the low-molecular polyphenylene ether.

Examples of the epoxy compound in which the average number of epoxy groups contained in one molecule thereof is 2 or more include bisphenol A-type epoxy resins, bisphenol F-type epoxy resins, bisphenol S-type epoxy resins, hydantoin-type epoxy resins, biphenyl-type epoxy resins, alicyclic epoxy resins, triphenylmethane-type epoxy resins, phenol novolac-type epoxy resins, cresol novolac-type epoxy resins, naphthol novolac-type epoxy resins, bis-A novolac-type epoxy resins, dicyclopentadiene/phenol epoxy resins, alicyclic amine epoxy resins, aliphatic amine epoxy resins, and halogenated products thereof. These epoxy compounds may be used alone or in a combination of two or more thereof. Particularly, an epoxy compound is preferably selected so that it provides an epoxidized polyphenylene ether having 3 epoxy groups or more per molecule on the average.

As the process for addition of phenolic hydroxyl groups contained in the low-molecular polyphenylene ether to epoxy groups contained in the epoxy compound, for example, a process can be adopted which involves reacting the phenolic hydroxyl and epoxy groups at 100° C. to 200° C. for 1 to 20 hours in the presence of a catalyst for reaction of these groups.

Here, examples of the catalyst include hydroxides such as sodium hydroxide and potassium hydroxide; alkylate salts such as sodium methylate and sodium butyrate; quaternary ammonium salts such as tetrabutylammonium chloride and tetramethylammonium bromide; phosphonium salts such as tetraphenylphosphonium bromide and amyltriphenylphosphonium bromide; imidazole catalysts such as 2methylimidazole and 2-methyl-4-imidazole; amine catalysts such as N,N-diethylethanolamine; and potassium chloride. These compound may be used alone or in a combination of two or more thereof.

The epoxidized polyphenylene ether obtained by the production process of the present embodiment not only exhibits good solubility in aromatic solvents such as toluene and xylene but also can show good solubility in ketones.

The epoxidized polyphenylene ether is also highly compatible with other epoxy resins and thereby can provide an epoxy resin composition forming a homogenous varnish. The epoxidized polyphenylene ether can offer a uniform cured product without causing layer separation from another epoxy resin because of its high reactivity.

Epoxy Resin Composition and Electronic Member

The epoxy resin composition according to the present embodiment comprises the epoxidized polyphenylene ether obtained by the above production process, an epoxy resin, and a curing agent for the epoxy resin. The epoxy resin composition of the present embodiment can provide an electronic member excellent in the peeling strength of a metal foil, solder heat resistance, solvent resistance, electrical characteristics, and the like.

The use of an epoxy resin having an oxazolidone ring as the above epoxy resin is preferable because it can improve adhesion to copper foil and plastics without reducing the heat resistance of the cured product.

The curing agent for the epoxy resin is preferably a curing agent capable of reacting with the epoxy resin to form a three-dimensional network structure. Examples of the curing agent include non-latent and latent curing agents which encompass amide curing agents such as dicyandiamides and aliphatic polyamides; amine curing agents such as diaminodiphenylmethane, metaphenylenediamine, ammonia, triethylamine, and diethylamine; phenol curing agents such as bisphenol A, bisphenol F, phenol novolac resin, cresol novolac resin, and p-xylene novolac resin; and acid anhydride curing agents. These agents may be used alone or in a combination of two or more thereof. The curing agent is added preferably at 0.1 to 10 equivalents, more preferably at 0.3 to 3 equivalents, still more preferably at 0.5 to 1.5 equivalents per epoxy equivalent of the whole epoxy resin composition.

The epoxy resin composition of the present embodiment may also contain a flame retardant.

Examples of the flame retardant used include at least one selected from the group consisting of brominated epoxy resins, epoxy-containing phosphazene compounds, phosphate esters, condensed phosphate esters, and quinone derivatives of phosphine compounds. The flame retardant is suitably added at 10 mass % or more based on the whole epoxy resin composition in view of more surely achieving flame retardancy. If the brominated epoxy resin is not chosen in selecting a flame retardant, the epoxy resin composition will be a halogen-free fire-retardant resin composition.

In the above epoxy resin composition, the epoxidized polyphenylene ether accounts for preferably 40 to 90 mass %, more preferably 50 to 60 mass % of the epoxy resin composition.

In addition, the epoxy resin accounts for preferably 1 to 50 mass %, more preferably 50 to 60 mass % of the epoxy resin composition.

Further, the flame retardant accounts for preferably 10 to 50 mass %, more preferably 20 to 25 mass % of the epoxy resin composition.

These contents of the components can achieve a cured product which has good electrical characteristics and has an extremely good balance among heat resistance, adhesion and processability while maintaining flame retardancy.

The epoxy resin composition of the present embodiment may further contain an accelerator.

Examples of the accelerator include imidazoles such as 2-methylimidazole, 2-methyl-4-ethylimidazole, and 2-phenylimidazole; tertiary amines such as 1,8-diazabicyclo [5.4.0]-undecene-7, triethylenediamine, and benzyldimethylamine; organic phosphines such as tributyl phosphine and triphenyl phosphine; and tetraphenylboron salts such as tetraphenylphosphonium tetraphenylborate and triphenylphosphine tetraphenylborate. These accelerators may be used alone or in a combination of two or more thereof.

When a molded product such as an electronic member is obtained using the epoxy resin composition of the present embodiment, a varnish thereof may be prepared in advance. Here, examples of a solvent for preparing the varnish include ketone solvents in addition to halogen solvents such as dichloromethane and chloroform and aromatic solvents such as benzene, toluene and xylene.

Examples of the ketone solvent include aliphatic ketones such as methyl ethyl ketone, methyl isopropyl ketone, methyl isobutyl ketone, and cyclohexanone and aromatic ketones such as acetophenone. In addition, for example, in a case where a curing agent such as a dicyandiamide or an accelerator less soluble in ketones is used, a solvent such as, for example, dimethylformamide, methyl cellosolve, propylene glycol monomethyl ether and mesitylene can also be used as a co-solvent when a ketone is employed as the main solvent.

The solid content concentration in the varnish is not particularly limited; however, it is preferably 30% to 80%.

The electronic member of the present embodiment is formed using the above epoxy resin composition. Examples of the form of the electronic member include an epoxy prepreg, a laminated board from an epoxy prepreg, a resin sheet, and a laminated board from a resin sheet.

Methods for producing the epoxy prepreg include, for example, a method which involves impregnating the varnish into a substrate and then drying the solvent, followed by heat curing. Examples of the substrate include glass cloth, aramid cloth, polyester cloth, nonwoven glass cloth, nonwoven aramid cloth, nonwoven polyester cloth, pulp paper, and linter paper. The amount of the resin impregnated into the substrate is not particularly limited; however, it is preferably set so that the resin content after drying is 30 to 70% based on the mass of the prepreg.

Method for producing the resin sheet include, for example, a method which involves applying the varnish to a metal foil, a polyethylene terephthalate film, or the like using a bar coater or the like and drying and removing the solvent. The film thus prepared and B-staged is laminated on a double-sided copper foil laminated board using a hot roll or the like and heat-treated in an oven or the like to make a multi-layered product.

Examples of methods for producing the laminated board include a method which involves laminating a prepreg, a resin sheet and a copper foil into a layer composition according to the purpose, followed by thermal compression. One specific example thereof involves laminating pluralities of prepregs and curable resin-metal foil composites on a substrate and bonding/thermal crosslinking the layers under thermal compression to provide a laminated board having a desired thickness. Another example thereof involves laminating a plurality of curable resin-metal foil composites on a substrate and bonding/thermal curing the layers under thermal compression to provide a laminated board having a desired thickness. The metal foil may be used as a surface layer or an intermediate layer. Examples of methods for producing the laminated board also include a method which involves repeating the laminating and curing processes a plurality of times for sequential multi-layering.

In this respect, with reference to curing temperature, the conditions of curing at 180° C. for one hour can be adopted, for example, as conditions for preparing a general-purpose FR4 laminated board.

EXAMPLES

The present invention is described below in further detail with reference to Examples and Comparative Examples. However, the invention is not intended to be limited to the following Examples.

The evaluation of characteristics was carried out by the following methods.

(1) Number Average Molecular Weight (Mn), Molecular Weight, and Molecular Weight Distribution (Mw/Mn)

Gel permeation chromatography analysis was performed using a column consisting of Shodex A-804, A-803, A-802 and A802 (trade name, manufactured by Showa Denko KK). Molecular weight was determined by comparison with the elution time of a polystyrene whose molecular weight is known.

(2) Phenolic Hydroxyl Group Equivalent and Number of Phenol Groups (Number of OH)

A low-molecular polyphenylene ether was dissolved in methylene chloride, to which a methanol solution of 0.1 N tetraethylammonium hydroxide was then added. The mixture was vigorously stirred and then measured for absorbance at 318 nm. The phenolic hydroxyl group equivalent (unit: meq/kg) was determined from the difference in absorbance between a case where the methanol solution of 0.1 N tetraethylammonium hydroxide was added and a case where the methanol solution was not added. In addition, the number of phenol groups per molecule was calculated from the phenolic hydroxyl group equivalent and number average molecular weight thus determined.

(3) Epoxy Equivalent

The epoxy equivalent was measured according to JIS K 7236.

(4) Measurement of ΔTg

Dicyandiamide was added in an amount of 0.6 equivalent as a curing agent based on the epoxy equivalent of an epoxidized polyphenylene ether, to which 2-methylimidazole was further added as an accelerator to provide a gelation time of 4 minutes and 30 seconds at 170° C. to offer a composition. The composition was cured at 180° C. for one hour and measured for glass transition temperature using a differential scanning calorimeter (trade name: DSC6220) manufactured by SII Nano Technology Inc. It was heated from 40° C. to 250° C. at 20° C./min in a nitrogen atmosphere. The glass transition temperature measured in the first round was defined as Tg 1, and the glass transition temperature measured under the same conditions after cooling, as Tg 2. The absolute value of Tg 1-Tg 2 was defined as ΔTg. ΔTg gives an index for observing the proceeding of curing.

(5) Solvent Resistance

The curing agent and accelerator were mixed in the epoxidized polyphenylene ether as described in (4), which was then cured at 180° C. for one hour. The resultant cured product was soaked in a 3% sodium hydroxide aqueous solution at 40° C. for 3 minutes and washed with running water for 20 minutes. The washed cured product was observed for surface roughness. When the roughness was compared between before and after the washing, the solvent resistance was determined as "good" in the case where no change therein was observed and, as "poor" in the case where the surface became rougher.

(6) Evaluation of Solubility

A measuring object was heat-dissolved in a solvent so as to provide a content of the measuring object of 30 mass %. After cooling to room temperature, the solution was allowed to stand at 25° C. for a predetermined number of days and then filtered using a membrane filter. The filter was heated to measure the number of days required for the difference between the mass of the filter from which the solvent has been volatilized (the total mass of the filter and the filtrate) and the mass of the filter per se to reach 0.1 mass % or less. The solubility was evaluated as "good" when the above number of days was 10 days or more, as "moderate" when it was from 5 days (inclusive) to 9 days (inclusive), and as "poor" when it was less than 5 days.

(7) Dielectric Constant and Loss Tangent of Laminated Board

The dielectric constant and loss tangent were measured according to JIS C 6481. The measuring apparatus used was an LCR meter (trade name: 4284A) manufactured by Agilent Technologies Inc.

Examples 1 to 8 and Comparative Examples 1 to 3

Redistribution reaction was conducted under the composition and reaction conditions each shown in Table 1 to provide low-molecular polyphenylene ethers I to XI. Table 1 also includes the analyses of the resultant low-molecular polyphenylene ethers. The details of the reaction conditions are given below.

Example 1

In a reactor equipped with a bottom plug valve was placed 300 g of mesitylene as a solvent, which was then heated to 90° C. Into the hot solution were dissolved 100 g of a raw polyphenylene ether with a number average molecular weight of 18,000 (trade name: S202A, manufactured by Asahi Kasei Chemicals Corporation) and 6 g of bisphenol A (BPA) as a polyphenol compound. Thereto was added 60 g of a 10% mesitylene solution of benzoyl peroxide (BPO) (trade name: Nyper BMT, manufactured by NOF Corporation) over a period of 240 minutes, which was then stirred at 90° C. for 60 minutes for redistribution reaction. Here, the radical initiator has a decomposition rate constant of 0.55, and a value of the decomposition rate constant divided by the addition time is 0.14 (1/hr).

An aqueous sodium hydrogencarbonate was added to the reaction solution to sufficiently wash the solution (alkali washing), and then only the aqueous solution was removed therefrom. A small amount of the organic layer obtained here was taken to determine the number average molecular weight (Mn) by the GPC method, which resulted in Mn being 2,560. The content of components with molecular weights of 20,000 or more was 4.9%, and the molecular weight distribution (Mw/Mn) was 2.2. The solvent in the same organic layer was also dried up to measure the phenolic hydroxyl group equivalent, which resulted in the equivalent being 625 meq/kg. Low-molecular polyphenylene ether I was thus obtained in which the number of phenol groups per molecule was about 1.6.

Example 2

In a reactor equipped with a bottom plug valve was placed 300 g of xylene as a solvent, which was then heated to 90° C. Into the hot solution were dissolved 100 g of a raw polyphenylene ether with a number average molecular weight of 20,000 (trade name: S201A, manufactured by Asahi Kasei Chemicals Corporation) and 8 g of bisphenol A (BPA) as a polyphenol compound. Thereto was added 400 g of a 2.5% xylene solution of benzoyl peroxide (BPO) (trade name: Nyper BMT, manufactured by NOF Corporation) over a period of 120 minutes, which was then reacted at 90° C. for 120 minutes. Here, the radical initiator has a decomposition rate constant of 0.55, and a value of the decomposition rate constant divided by the dropwise addition time is 0.28 (1/hr).

An aqueous sodium hydrogencarbonate was added to the reaction solution to sufficiently wash the solution (alkali washing), and then only the aqueous solution was removed therefrom. A small amount of the organic layer obtained here was taken to determine the number average molecular weight (Mn) by the GPC method, which resulted in Mn being 2,120. The content of components with molecular weights of 20,000 or more was 3.1%, and the molecular weight distribution (Mw/Mn) was 2.1. The solvent in the same organic layer was also dried up to measure the phenolic hydroxyl group equivalent, which resulted in the equivalent being 850 meq/kg. Low-molecular polyphenylene ether II was thus obtained in which the number of phenol groups per molecule is about 1.8.

Example 3

In a reactor equipped with a bottom plug valve was placed 300 g of toluene as a solvent, which was then heated to 90° C. Into the hot solution were dissolved 100 g of a raw polyphenylene ether with a number average molecular weight of 18,000 (trade name: S202A, manufactured by Asahi Kasei Chemicals Corporation) and 8 g of bisphenol A (BPA) as a polyphenol compound, the resulting solution was then cooled to 70° C. and charged with 1.6 ml of a 7% cobalt naphthenate mineral spirit solution (manufactured by Wako Pure Chemical Industries Ltd.) as a catalyst. Thereto was added 400 g of a 2.5% toluene solution of benzoyl peroxide (trade name: Nyper BMT, manufactured by NOF Corporation) over a period of 240 minutes, which was then reacted at 70° C. for 240 minutes. Here, the radical initiator has a decomposition rate constant of 0.05, and a value of the decomposition rate constant divided by the dropwise addition time is 0.013 (1/hr).

An aqueous sodium hydrogencarbonate was added to the reaction solution to sufficiently wash the solution (alkali washing), and then only the aqueous solution was removed therefrom. A small amount of the organic layer obtained here was taken to determine the number average molecular weight by the GPC method, which resulted in the molecular weight being 1,820. The content of components with molecular weights of 20,000 or more was 0.5%, and the molecular weight distribution (Mw/Mn) was 1.7. The solvent in the same organic layer was also dried up to measure the phenolic hydroxyl group equivalent, which resulted in the equivalent being 1,050 meq/kg. Low-molecular polyphenylene ether III was thus obtained in which the number of phenol groups per molecule is about 1.9.

Example 4

In a reactor equipped with a bottom plug valve was placed 500 g of toluene as a solvent, which was then heated to 90° C. Into the hot solution were dissolved 100 g of a raw polyphenylene ether with a number average molecular weight of 18,000 (trade name: S202A, manufactured by Asahi Kasei Chemicals Corporation) and 8 g of bisphenol A (BPA) as a polyphenol compound, the resulting solution was then cooled to 80° C. and charged with 1.6 ml of a 7% cobalt naphthenate mineral spirit solution (manufactured by Wako Pure Chemical Industries Ltd.) as a catalyst. Thereto was added 15 g of diisopropylbenzene hydroperoxide (trade name: Percumyl P, manufactured by NOF Corporation) over a period of 60 minutes, which was then reacted at 80° C. for 240 minutes. Here, the radical initiator has a decomposition rate constant of 0.0001, and a value of the decomposition rate constant divided by the dropwise addition time is 0.0001 (1/hr).

An aqueous sodium hydrogencarbonate was added to the reaction solution to sufficiently wash the solution (alkali washing), and then only the aqueous solution was removed therefrom. A small amount of the organic layer obtained here was taken to determine the number average molecular weight by the GPC method, which resulted in the molecular weight being 3,900. The content of components with molecular weights of 20,000 or more was 1.9%, and the molecular weight distribution (Mw/Mn) was 1.8. The solvent in the same organic layer was also dried up to measure the phenolic hydroxyl group equivalent, which resulted in the equivalent being 450 meq/kg. Low-molecular polyphenylene ether IV was thus obtained in which the number of phenol groups per molecule is about 1.7.

Example 5

The same production as in the production example 3 was carried out except that cobalt naphthenate was charged after the dropwise addition of benzoyl peroxide. The resultant organic layer was used to determine the number average molecular weight by the GPC method, which resulted in the molecular weight being 1,820. The content of components with molecular weights of 20,000 or more was 0.8%, and the molecular weight distribution (Mw/Mn) was 2.0. The solvent in the same organic layer was also dried up to measure the phenolic hydroxyl group equivalent, which resulted in the equivalent being 930 meq/kg. Low-molecular polyphenylene ether V was thus obtained in which the number of phenol groups per molecule is about 1.7.

Comparative Example 1

In a reactor equipped with a bottom plug valve was placed 100 g of toluene as a solvent, which was then heated to 90° C. Into the hot solution were dissolved 100 g of a raw polyphenylene ether with a number average molecular weight of 18,000 (trade name: S202A, manufactured by Asahi Kasei Chemicals Corporation) and 6 g of bisphenol A (BPA) as a polyphenol compound. Thereto was added 6 g of benzoyl peroxide (trade name: Nyper BMT, manufactured by NOF Corporation) over a period of 6 minutes, which was then stirred at 90° C. for 60 minutes for redistribution reaction. Here, the radical initiator had a decomposition rate constant of 0.55, and a value of the decomposition rate constant divided by the dropwise addition time was 5.5 (1/hr).

An aqueous sodium hydrogencarbonate was added to the reaction solution to sufficiently wash the solution (alkali washing), and then only the aqueous solution was removed therefrom. A small amount of the organic layer obtained here was taken to determine the number average molecular weight by the GPC method, which resulted in the molecular weight being 2,300. The content of components with molecular weights of 20,000 or more was 21.0%, and the molecular weight distribution (Mw/Mn) was 3.2. The solvent in the same organic layer was also dried up to measure the phenolic hydroxyl group equivalent, which resulted in the equivalent being 625 meq/kg. Low-molecular polyphenylene ether VI was thus obtained in which the number of phenol groups per molecule is about 1.4.

Comparative Example 2

In a reactor equipped with a bottom plug valve was placed 100 g of toluene as a solvent, which was then heated to 90° C. Into the hot solution were dissolved 100 g of a raw polyphenylene ether with a number average molecular weight of 18,000 (trade name: S202A, manufactured by Asahi Kasei Chemicals Corporation) and 6 g of bisphenol A (BPA) as a polyphenol compound. Thereto was added 60 g of a 10% toluene solution of benzoyl peroxide (trade name: Nyper BMT, manufactured by NOF Corporation) over a period of 120 minutes, which was then stirred at 90° C. for 60 minutes for redistribution reaction. Here, the radical initiator had a decomposition rate constant of 0.55, and a value of the decomposition rate constant divided by the dropwise addition time was 0.28 (1/hr).

An aqueous sodium hydrogencarbonate was added to the reaction solution to sufficiently wash the solution (alkali washing), and then only the aqueous solution was removed therefrom. A small amount of the organic layer obtained here was taken to determine the number average molecular weight by the GPC method, which resulted in the molecular weight being 2,400. The content of components with molecular weights of 20,000 or more was 13.0%, and the molecular weight distribution (Mw/Mn) was 3.1. The solvent in the same organic layer was also dried up to measure the phenolic hydroxyl group equivalent, which resulted in the equivalent being 650 meq/kg. Low-molecular polyphenylene ether VII was thus obtained in which the number of phenol groups per molecule is about 1.6.

Example 6

The same experiment as in the production example 3 was carried out except that the temperature during the dropwise addition and the reaction temperature were both set at 110° C. Here, the radical initiator has a decomposition rate constant of 5.1, and a value of the decomposition rate constant divided by the dropwise addition time is 1.3 (1/hr). The resultant organic layer was used to determine the number average molecular weight by the GPC method, which resulted in the molecular weight being 1,750. The content of components with molecular weights of 20,000 or more was 8.5%, and the molecular weight distribution (Mw/Mn) was 3.2. The solvent in the same organic layer was also dried up to measure the phenolic hydroxyl group equivalent, which resulted in the equivalent being 810 meq/kg. Low-molecular polyphenylene ether VIII was thus obtained in which the number of phenol groups per molecule is about 1.4.

Example 7

The same experiment as in the production example 1 was carried out except use of 2,6-xylenol in place of bisphenol A. The resultant organic layer was used to determine the number average molecular weight by the GPC method, which resulted in the molecular weight being 2,380. The content of components with molecular weights of 20,000 or more was 9.3%, and the molecular weight distribution (Mw/Mn) was 2.5. The solvent in the same organic layer was also dried up to measure the phenolic hydroxyl group equivalent, which resulted in the equivalent being 460 meq/kg. Low-molecular polyphenylene ether IX was thus obtained in which the number of phenol groups per molecule is about 1.1.

Comparative Example 3

In a reactor equipped with a bottom plug valve was placed 900 g of toluene as a solvent, which was then heated to 90° C. Into the hot solution were dissolved 100 g of a raw polyphenylene ether with a number average molecular weight of 18,000 (trade name: S202A, manufactured by Asahi Kasei Chemicals Corporation) and 2 g of bisphenol A (BPA) as a polyphenol compound. Thereto was added 100 g a 2% toluene solution of benzoyl peroxide (trade name: Nyper BMT, manufactured by NOF Corporation) over a period of 240 minutes, which was then reacted at 90° C. for 240 minutes. Here, the radical initiator had a decomposition rate constant of 0.55, and a value of the decomposition rate constant divided by the dropwise addition time was 0.14 (1/hr).

An aqueous sodium hydrogencarbonate was added to the reaction solution to sufficiently wash the solution (alkali washing), and then only the aqueous solution was removed therefrom. A small amount of the organic layer obtained here was taken to determine the number average molecular weight by the GPC method, which resulted in the molecular weight being 8,400. The content of components with molecular weights of 20,000 or more was 36.2%, and the molecular weight distribution (Mw/Mn) was 2.7. The solvent in the same organic layer was also dried up to measure the phenolic hydroxyl group equivalent, which resulted in the equivalent being 160 meq/kg. Low-molecular polyphenylene ether X was thus obtained in which the number of phenol groups per molecule is about 1.3.

Example 8

The same experiment as in the production example 1 was carried out except for elimination of the step of washing with an aqueous sodium hydrogencarbonate to provide low-molecular polyphenylene ether X. The organic layer was used to determine the number average molecular weight by the GPC method, which resulted in the molecular weight being 2,610. The content of components with molecular weights of 20,000 or more was 5.3%, and the molecular weight distribution (Mw/Mn) was 2.2. The solvent in the same organic layer was also dried up to measure the phenolic hydroxyl group equivalent, which resulted in the equivalent being 580 meq/kg. Low-molecular polyphenylene ether X was thus obtained in which the number of phenol groups per molecule is about 1.5.

TABLE 1

| | | | Ex. 1 | Ex. 2 | Ex. 3 | Ex. 4 | Ex. 5 |
|---|---|---|---|---|---|---|---|
| Composition (g) | Raw polyphenylene ether | | 100 | 100 | 100 | 100 | 100 |
| | Polyphenol compound | BPA | 6 | 8 | 8 | 8 | 8 |
| | | 2,6-Xylenol | | | | | |
| | Radical initiator | BPO | 6 | 10 | 15 | | 15 |
| | | Percumyl P | | | | 15 | |
| | Solvent | Mesitylene | 354 | | | | |
| | | Xylene | | 690 | | | |
| | | Toluene | | | 690 | 500 | 690 |
| | Catalyst | Cobalt naphthenate | | | 0.112 | 0.112 | 0.112-(added later) |
| Reaction conditions | Alkali washing | | good | good | good | good | good |
| | Dropwise addition time (hr) | | 4 | 2 | 4 | 1 | 4 |
| | Reaction temperature (° C.) | | 90 | 90 | 80 | 80 | 80 |
| | Decomposition rate constant | | 0.55 | 0.55 | 0.05 | 0.0001 | 0.17 |
| | Decomposition rate constant/addition time (l/hr) | | 0.14 | 0.275 | 0.0125 | 0.0001 | 0.0425 |
| | 100 × Raw polyphenylene ether amount/solvent amount | | 28.2 | 14.5 | 14.5 | 20.0 | 14.5 |
| | 100 × Radical initiator amount/solvent amount | | 1.7 | 1.4 | 2.2 | 3.0 | 2.2 |
| | 100 × Radical initiator amount/radical initiator addition time (parts by mass/min) | | 0.015 | 0.050 | 0.038 | 0.150 | 0.050 |
| | Resultant low-molecular polyphenylene ether | | I | II | III | IV | V |
| Analyses | Mn | | 2560 | 2120 | 1800 | 3900 | 1820 |
| | Phenolic hydroxyl group equivalent | | 625 | 850 | 1050 | 450 | 930 |
| | Number of OH groups | | 1.60 | 1.80 | 1.89 | 1.76 | 1.69 |
| | MOL ≧ 20000(%) | | 4.9 | 3.1 | 0.5 | 1.9 | 0.8 |
| | Mw/Mn | | 2.2 | 2.1 | 1.9 | 1.8 | 2.0 |

| | | | Comp. Ex. 1 | Comp. Ex. 2 | Ex. 6 | Ex. 7 | Comp. Ex. 3 | Ex. 8 |
|---|---|---|---|---|---|---|---|---|
| Composition (g) | Raw polyphenylene ether | | 100 | 100 | 100 | 100 | 100 | 100 |
| | Polyphenol compound | BPA | 6 | 6 | 8 | | 2 | 6 |
| | | 2,6-Xylenol | | | | 6 | | |
| | Radical initiator | BPO | 6 | 6 | 15 | 6 | 2 | 6 |
| | | Percumyl P | | | | | | |
| | Solvent | Mesitylene | | | | 354 | | 354 |
| | | Xylene | | | | | | |
| | | Toluene | 100 | 154 | 690 | | 1000 | |
| | Catalyst | Cobalt naphthenate | | | 0.112 | | | |
| Reaction conditions | Alkali washing | | good | good | good | good | good | poor |
| | Dropwise addition time (hr) | | 0.1 | 2 | 0.1 | 4 | 4 | 4 |
| | Reaction temperature (° C.) | | 90 | 90 | 110 | 90 | 90 | 90 |
| | Decomposition rate constant | | 0.55 | 0.55 | 5.07 | 0.55 | 0.55 | 0.55 |
| | Decomposition rate constant/addition time (l/hr) | | 5.5 | 0.275 | 50.7 | 0.1375 | 0.1375 | 0.1375 |
| | 100 × Raw polyphenylene ether amount/solvent amount | | 100.0 | 64.9 | 14.5 | 28.2 | 10.0 | 28.2 |
| | 100 × Radical initiator amount/solvent amount | | 6.0 | 3.9 | 2.2 | 1.7 | 0.2 | 1.7 |
| | 100 × Radical initiator amount/radical initiator addition time (parts by mass/min) | | 0.600 | 0.020 | 0.030 | 0.015 | 0.005 | 0.015 |

TABLE 1-continued

| Resultant low-molecular polyphenylene ether | | VI | VII | VIII | IX | X | XI |
|---|---|---|---|---|---|---|---|
| Analyses | Mn | 2300 | 2400 | 1750 | 2380 | 8400 | 2610 |
| | Phenolic hydroxyl group equivalent | 620 | 650 | 810 | 460 | 160 | 580 |
| | Number of OH groups | 1.43 | 1.56 | 1.42 | 1.09 | 1.34 | 1.51 |
| | MOL ≧ 20000(%) | 21 | 13 | 8.5 | 9.3 | 36.2 | 7 |
| | Mw/Mn | 3.2 | 3.1 | 3.2 | 2.2 | 2.7 | 2.2 |

From the results of Table 1, the following contents can be read.

(1) To reduce "MOL≧20,000 (%)" (the content of components with molecular weights of 20,000 or more) to 10% or less, it is effective to use a catalyst, control the dropwise addition time of a radical initiator, control the quantitative ratio of a raw polyphenylene ether to a solvent, and control the quantitative ratio of a radical initiator to a solvent.

(2) To improve (narrow) the molecular weight distribution (Mw/Mn), it is effective to control the dropwise addition time of a radical initiator, control the quantitative ratio of a raw polyphenylene ether to a solvent, and control the quantitative ratio of a radical initiator to a solvent.

Examples 9 to 16 and Comparative Examples 4 to 7

To 40 g of a bisphenol A-type epoxy resin (trade name: AER250, manufactured by Asahi Kasei Chemicals Corporation) was added 0.1 g of tri-o-tolylphosphine as a catalyst, which was sufficiently stirred and then heated up to 160° C. In addition, each one of the low-molecular polyphenylene ethers I to XI or a high-molecular polyphenylene ether with a number average molecular weight of 18,000 (trade name: S202A, manufactured by Asahi Kasei Chemicals Corporation) was (dropwise) added so as to provide a loading of 60 g. The mixture was reacted for 5 hours to provide an epoxidized polyphenylene ether (epoxidized PPE). The results of evaluation of various physical properties thereof are shown in Table 2.

To 70 g of each epoxidized PPE obtained as described above was added 30 g of a highly brominated epoxy resin (trade name: AER8018, manufactured by Asahi Kasei Chemicals Corporation), added dicyandiamide as a curing agent in an amount of 0.6-fold equivalent as the amino group amount based on the epoxy group in the composition, and added methyl ethyl ketone as a solvent. Each varnish had a solid content of 60 mass %. In Examples 9 to 11, assuming that the phenolic hydroxyl group of each low-molecular polyphenylene ether reacted with the epoxy group, dicyandiamide was added in such an amount to correspond to the number of epoxy groups from which the number of phenolic hydroxyl group was subtracted. 2-Methylimidazole was also added as a curing agent in an amount ranging from 0.1 to 0.3 mass % based on the solid content of each varnish, in which the gelation time of the varnish at 170° C. fell within the range of 4 to 5 minutes. Thus epoxy resin varnishes were obtained.

Each epoxy resin varnish was impregnated into a glass cloth (trade name: 2116, manufactured by Asahi-Scwebel Corporation) and dried to provide a prepreg having a resin content of 50 mass %. Four sheets of the prepreg were layered one after another and each copper foil sheet 35 μm thick was superposed on the upper and lower sides of the multilayer. The resultant composite was thermally compressed for 60 minutes under conditions of a temperature of 190° C. and a pressure of 20 kg/cm². Thus double-sided copper-clad laminated boards were obtained.

The resultant double-sided copper-clad laminated boards were evaluated for various laminated board physical properties. The results are shown in Table 2. In this respect, in Comparative Examples 4 and 5, ΔTg's were each determined to be unanalyzable since two Tg's appeared.

TABLE 2

| | | Ex. | | | | | Comp. Ex. | | Ex. | | Comp. Ex. | Ex. | Comp. Ex. |
|---|---|---|---|---|---|---|---|---|---|---|---|---|---|
| | | 9 | 10 | 11 | 12 | 13 | 4 | 5 | 14 | 15 | 6 | 16 | 7 |
| Physical properties of epoxidized PPE | PPE used | I | II | III | IV | V | VI | VII | VIII | IX | X | XI | SA202 |
| | Epoxy equivalent (g/eq) | 422 | 523 | 576 | 384 | 510 | 422 | 438 | 401 | 391 | 380 | 475 | 378 |
| | Phenolic hydroxyl group equivalent (meq/Kg) | 9.7 | 5.4 | 4.8 | 8.6 | 7.3 | 29.6 | 19.7 | 14.2 | 52 | 52 | 292 | 30.5 |
| | Reaction rate | 97.4 | 98.9 | 99.2 | 96.8 | 98.7 | 92.0 | 94.9 | 97.1 | 81.2 | 45.8 | 16.1 | 10.9 |
| | Solubility in toluene | good | good | good | good | good | poor | poor | moderate | moderate | poor | good | poor |
| | Solubility in methyl ethyl ketone | poor | poor | good | moderate | good | poor | poor | poor | poor | poor | poor | poor |
| Physical properties of laminated board | Tg1 | 171 | 175 | 180 | 181 | 179 | 130, 162 | 137, 164 | 173 | 150 | 163 | 158 | 127 |
| | Tg2 | 172 | 174 | 181 | 179 | 179 | 122, 171 | 135, 169 | 171 | 152 | 170 | 169 | 135 |
| | ΔTg | 1 | 0 | 1 | 2 | 0 | — | — | 2 | 2 | 7 | 11 | 8 |
| | Solvent resistance | good | good | good | good | good | poor | poor | good | poor | poor | poor | poor |
| | Dielectric constant | 3.8 | 3.8 | 3.7 | 3.6 | 3.7 | 3.9 | 3.9 | 3.8 | 3.9 | 3.8 | 4.2 | 3.6 |
| | Loss tangent | 0.008 | 0.008 | 0.007 | 0.007 | 0.007 | 0.010 | 0.010 | 0.009 | 0.009 | 0.008 | 0.013 | 0.005 |

From the results of Table 2, the following contents can be read.

(1) The low-molecular polyphenylene ethers having a "MOL≧20,000 (%)" of 10% or less (preferably 5% or less) were each used and epoxy-modified to provide the epoxidized polyphenylene ether having good solubility in toluene at room temperature. In addition, the low-molecular polyphenylene ethers having a "MOL≧20,000 (%)" of 2% or less were each used and epoxy-modified to provide the epoxidized polyphenylene ether having good solubility in methyl ethyl ketone.

(2) The low-molecular polyphenylene ethers having a "MOL≧20,000 (%)" of 10% or less and a number of phenolic hydroxyl groups of 1.2 or more were each used and epoxy-modified to provide an epoxidized polyphenylene ether. The epoxy resin composition containing the epoxidized polyphenylene ether was cured without causing phase separation during the production of the laminated board. In addition, the laminated board had a better solvent resistance.

(3) The step of washing with alkali was adopted in producing the low-molecular polyphenylene ethers to provide the laminated boards favorable in glass transition temperature, electrical characteristics and the like.

The invention claimed is:

1. A process for producing a low-molecular polyphenylene ether having a content of components with molecular weights of 20,000 or more of 10 mass % or less and a number average molecular weight of 4,000 or less by a redistribution reaction which involves reacting a raw polyphenylene ether having a number average molecular weight of 10,000 or more with a polyphenol compound and a radical initiator, characterized in that:
the radical initiator is added during the redistribution reaction at an average rate of 0.1 part by mass/minute or less based on 100 parts by mass of the raw polyphenylene ether;
the redistribution reaction is conducted in a solvent;
a weight ratio of the raw polyphenylene ether to the solvent 0.4:100 to 40:100; and
a weight ratio of the radical initiator to the solvent 0.5:100 to 5:100.

2. The production process according to claim 1, wherein the low-molecular polyphenylene ether has an average number of phenolic hydroxyl groups per molecule of 1.2 or more.

3. The production process according to claim 2, wherein the redistribution reaction step is a step performed using at least one catalyst selected from the group consisting of metal naphthenates, vanadium pentoxide, aniline, amine compounds, quaternary ammonium salts, imidazole, and phosphonium salts.

4. The production process according to claim 3, wherein the redistribution reaction step is a step in which the radical initiator is added under such conditions that a decomposition rate constant of the radical initiator divided by an addition time of the radical initiator is 0.5 $hr^{-1}$ or less.

5. The production process according to claim 4, wherein the process comprises a step of washing the low-molecular polyphenylene ether with water and/or an alkaline solution after the redistribution reaction step.

6. The production process according to claim 5, wherein the radical initiator is benzoyl peroxide or a benzoyl peroxide derivative.

7. A process for producing an epoxidized polyphenylene ether resin by addition of phenolic hydroxyl groups contained in a low-molecular polyphenylene ether having a number average molecular weight of 4,000 or less to epoxy groups contained in an epoxy compound, characterized in that:
the low-molecular polyphenylene ether has a content of components with molecular weights of 20,000 or more of 10 mass % or less; and
the epoxy compound has an average number of the epoxy groups per molecule of 2 or more, wherein
the low-molecular polyphenylene ether has an average number of the phenolic hydroxyl groups per molecule of 1.2 or more, and
the low-molecular polyphenylene ether is a low-molecular polyphenylene ether obtained by the production process according to claim 6.

8. The production process according to claim 1, wherein the redistribution reaction step is a step performed using at least one catalyst selected from the group consisting of metal naphthenates, vanadium pentoxide, aniline, amine compounds, quaternary ammonium salts, imidazole, and phosphonium salts.

9. The production process according to claim 1, wherein the redistribution reaction step is a step in which the radical initiator is added under such conditions that a decomposition rate constant of the radical initiator divided by an addition time of the radical initiator is 0.5 $hr^{-1}$ or less.

10. The production process according to claim 1, wherein the process comprises a step of washing the low-molecular polyphenylene ether with water and/or an alkaline solution after the redistribution reaction step.

11. The production process according to claim 1, wherein the radical initiator is benzoyl peroxide or a benzoyl peroxide derivative.

* * * * *

UNITED STATES PATENT AND TRADEMARK OFFICE
CERTIFICATE OF CORRECTION

| | | |
|---|---|---|
| PATENT NO. | : 7,858,726 B2 | |
| APPLICATION NO. | : 12/224181 | |
| DATED | : December 28, 2010 | |
| INVENTOR(S) | : Kenzo Onizuka et al. | |

It is certified that error appears in the above-identified patent and that said Letters Patent is hereby corrected as shown below:

Title Page Item (73) (Assignee), delete "Chemichals" and insert -- Chemicals --, therefor.

Title Page Column 2 (Other Publications), Line 12 delete "mailed" and insert -- mailed on --, therefor.

Column 21, Line 41 in Claim 1, delete "solvent" and insert -- solvent is --, therefor.

Column 21, Line 43 in Claim 1, delete "solvent" and insert -- solvent is --, therefor.

Signed and Sealed this
Twenty-sixth Day of April, 2011

David J. Kappos
*Director of the United States Patent and Trademark Office*